FREQUENCY RESPONSIVE DEVICE AND SYSTEM EMPLOYING THE SAME

Filed April 26, 1952 2 Sheets-Sheet 1

INVENTORS
VICTOR AZGAPETIAN and
JURGEN WORTHING
BY
Eyre, Mann & Burrows
ATTORNEYS INVENTORS
VICTOR AZGAPETIAN and
JURGEN WORTHING
BY
Eyre, Mann & Burrows
ATTORNEYS United States Patent Office 2,747,149

Patented May 22, 1956

2,747,149

FREQUENCY RESPONSIVE DEVICE AND SYSTEM EMPLOYING THE SAME

Victor Azgapetian, Roslyn Heights, and Jurgen Worthing, Wantagh, N. Y., assignors to Servomechanisms, Inc., a corporation of New York Application April 26, 1952, Serial No. 284,668

2 Claims. (Cl. 318—29)

The present invention relates to frequency controlled devices, such as variable frequency oscillators or the like, and comprises a novel device of this type incorporating simple and readily adjustable means for maintaining a fixed or controllably varying frequency of oscillation. The invention includes also a novel remote position control system employing the new frequency controlled devices as integral parts thereof.

When a capacitor is alternately fully charged by connection across a pair of terminals and then disconnected from the terminals and fully discharged, a charge Q equal to CE where C is capacity of the capacitor and E the potential across the terminals, will be transferred from one terminal to the other each charge-discharge cycle. Thus if the length of each cycle in seconds is $t$, then the charge transfered each second will by $Q/t=CE/t$ which is the steady-state current I where "steady-state" signifies average over periods long compared to the alternation period. Thus—

$$I=\frac{CE}{t} \text{ or } \frac{t}{C}=\frac{E}{I}$$

which, by Ohm's law, is the steady-state resistance at the terminals. Thus the resistance $R_v$ measured at the terminals depends only on the capacity of the capacitor and on the frequency of the charge and discharge cycle, the relation being—

$$R_v=\frac{1}{fC}$$

where $f$ is the frequency, equal to $1/t$.

The present invention by employing such a virtual resistance as part of a frequency controlling means provides a frequency controlled device which is stable and readily controllable over a relatively wide frequency range. Briefly, the new device may comprise a source of oscillations, a balancing direct current network such as a Wheatstone bridge in one arm of which is a virtual resistance of the above described type varying inversely with the frequency of the source and means responsive to unbalance of the network for adjusting the frequency of the oscillations produced by the source in a direction to restore balance of the network. An adjustable resistor in a second arm of the network can be provided for causing the network to balance at a different frequency.

When a device such as above briefly described is provided at one location and a balancing network at a second location is provided having in one branch a virtual resistance responsive to the frequency of the source of oscillation at the first location, a remote postion control system results that is dependent only on the frequency of the transmitted signal.

For a better understanding of the invention and of specifice embodiments thereof, reference may be had to the accompanying drawings, of which—

Figure 1:
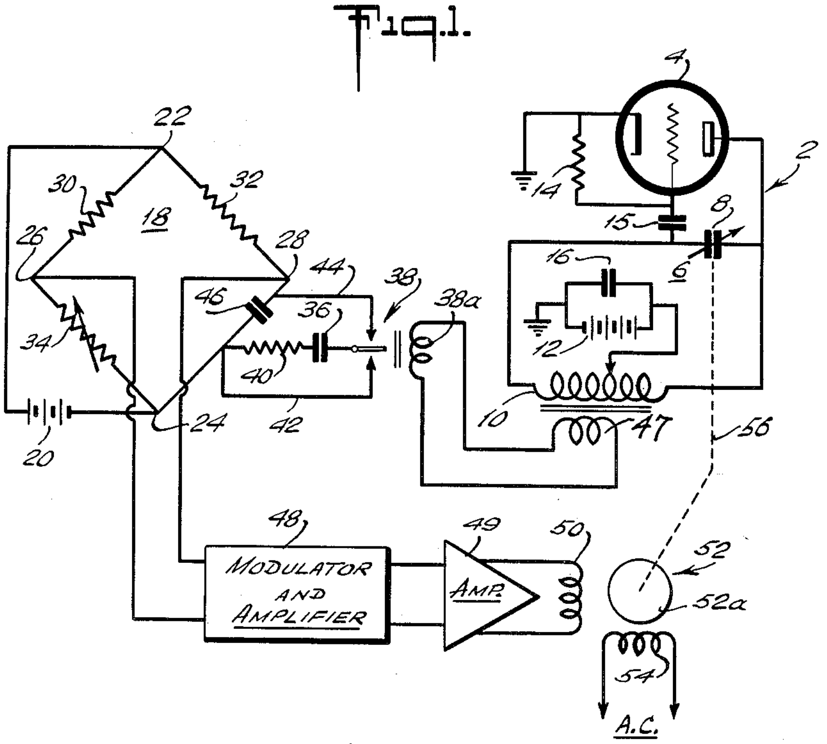
Fig. 1 is a circuit diagram of a controlled frequency oscillator embodying the invention, frequency control being effected through a servo mechanism controlled from a balancing network and mechanically coupled to a frequency varying element of a tank circuit.

In the embodiment of the invention illustrated in Fig. 1 a conventional oscillator circuit 2 is indicated as comprising a triode 4 and tank circuit 6, the latter comprising the parallel connected variable capacitor 8 and inductor 10. A source of energy, indicated as a battery 12, has its positive terminal connected to a point on inductor 10 and its negative terminal grounded. The cathode of tube 4 is connected to ground and the grid is returned to ground through a resistor 14, a blocking capacitor 15 being provided in the connection between the grid and tank circuit 6. A capacitor 16 is connected across the source 12 for by-passing alternating current about the source. In accordance with the invention, adjustment of capactior 8 and therefore of the frequency of oscillation of the above described circuit is effected by means responsive to unbalance of a network containing a virtual resistance A Wheatstone bridge network 18 is provided energized by direct current from a battery 20 or other source connected across input terminals 22 and 24 and having output terminals 26 and 28. Fixed resistances 30 and 32 comprise two arms of the bridge, an adjustable resistance 34 comprises a third arm and the virtual resistance now to be described and inversely proportional to the frequency of the oscillator 2 comprises the fourth arm. The virtual resistance comprises a condenser 36 and a single pole double throw oscillatory electromagnetic switch 38 which in one position of the movable arm connects the condenser 36 into the fourth arm of the network 18 and in the other position disconnects the condenser from the network and causes its discharge. Preferably, the condenser 36 is both charged and discharged through a current limiting resistor and therefore a resistor 40 is connected between one side of the condenser 36 and input terminal 24 of the bridge. A lead 42 connects the end of resistor 40 remote from condenser 36 with one terminal of the switch 38 for discharge of the condenser. The other terminal of the switch is connected by a lead 44 with output terminal 28 of the bridge. A quenching condenser 46 is permanently connected across terminals 24 and 28. In order that the virtual resistance across terminals 24 and 28 will vary inversely with the frequency of oscillator 2 a coil 47 is inductively coupled to the inductance 10 of the tank circuit 6 and connected in circuit with the coil 38*a* of the electromagnetic switch 38. With the above described circuit arrangement, depending upon the particular adjustment of resistor 34, there will be an output voltage appearing across terminals 26 and 28 unless the frequency of oscillator 2 is such that the virtual resistance appearing across terminals 24 and 28 brings the network into balance. This output voltage of the network is employed to change the oscillator frequency in a direction to balance the bridge. In the particular embodiment of the invention illustrated in Fig. 1 the output terminals 26 and 28 are connected through a modulator and amplifier 48 and servo amplifier 49 with one winding 50 of a servomotor 52, the other winding 54 of which is supplied with alternating current from any suitable source. The rotor 52*a* of the motor is mechanically coupled, as indicated by the dashed line 56, with the condenser 8 of the tank circuit. The modulator of unit 48 may be any suitable means for converting the varying direct current signal appearing across the output terminals of the bridge into a corresponding alternating current suitable for amplification and energization of the servomotor. The unit 48 could be, for example, the modulating and amplifying circuit disclosed and claimed in application Serial No. 118,968, filed September 30, 1949, of George M. Attura or that of application Serial No. 202,490, filed December 23, 1950, of Samuel Feinstein, each of which is assigned to the same assignee as the instant application.

From the foregoing description of the device of Fig. 1 it will be apparent that the device operates to maintain constant the frequency of oscillator 2 so long as the resistance of resistor 34 is not altered and operates, upon change in resistor 34, to vary correspondingly the frequency of the oscillator. Thus the device provides a stable oscillator and one the frequency of which may be readily varied in response to manual or automatic adjustment of a resistor. As the controlling network includes only resistors and capacities, circuit elements that can be produced with high precision, stability of the device is extremely high.

Figure 2:
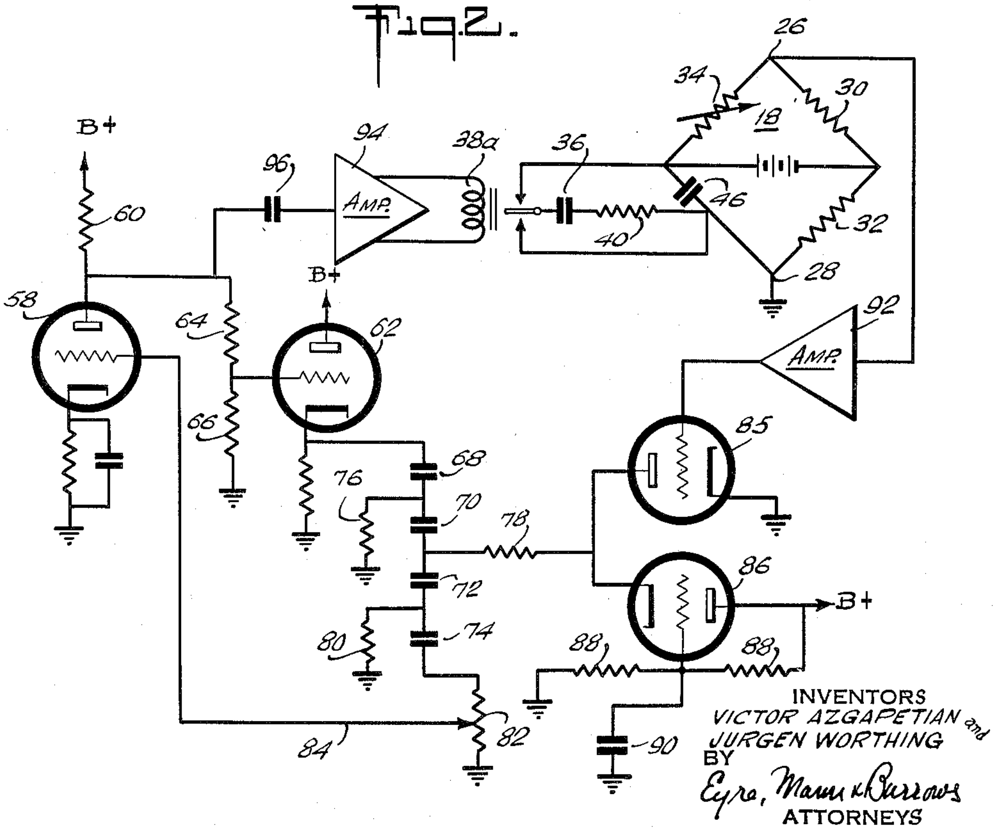
Fig. 2 is a circuit diagram of a controlled frequency oscillator representing another embodiment of the invention, frequency control in this instance being effected electrically.

The embodiment of the invention illustrated diagrammatically in Fig. 2 differs from that of Fig. 1 primarily in the means for adjusting the frequency in response to unbalance of the bridge network. In Figs. 1 and 2 like elements are identified by the same reference numbers. The oscillatory circuit of Fig. 2 is that of an RC phase shift oscillator and comprises an amplifying tube 58 the anode of which is connected to a source of positive potential, indicated as B+ through a dropping resistor 60 and the control grid of which is connected to the output circuit of a cathode follower tube 62 the control grid of which is connected through a resistor 64 with the anode of tube 60 and is returned to ground through a resistor 66.

The output circuit of the cathode follower 62 comprises four fixed condensers 68, 70, 72 and 74 connected in series and four resistors 76, 78, 80 and 82. Resistor 76 is connected between ground and the junction of condensers 68 and 70, and resistor 80 is connected between ground and the junction of condensers 72 and 74. Resistor 82, which is connected between ground and condenser 74, has a tap thereon connected by a lead 84 with the control grid of tube 58. One end of resistor 78 is connected to the junction of condensers 70 and 72 and the other end is connected to the anode of a triode 85, the cathode of which is grounded, and to the cathode of a triode 86 and the anode of which is tied to B+. The grid of triode 86 is maintained at a constant positive potential by connection to a potential divider 88 connected between B+ and ground. A condenser 90 is connected between the grid of tube 86 and ground. The potential of the control grid of tube 85 is controlled in response to the extent and direction of unbalance of the network 18 containing in one arm the virtual resistance responsive to the frequency of the oscillator. For this purpose a high gain amplifier 92 is connected between terminal 26 of the bridge and the control grid of tube 85, terminal 28 of the bridge being grounded. Thus when the virtual resistance of the branch of the bridge 18 containing condenser 36 decreases and causes unbalance of the bridge, assuming previous balance, the potential at terminal 26 becomes negative and the current through tube 85 is decreased or cut off, increasing the resistance in series with resistor 78, decreasing the time constant of the output circuit of the cathode follower 62 and correspondingly decreasing the frequency of the oscillator. Coil 38*a* of the vibratory switch is energized by a power amplifier 94 the input terminal of which is connected through a condenser 96 with the anode of tube 58. Thus the arrangement, like that of Fig. 1, operates to maintain constant the frequency of the oscillatory circuit and, in response to adjustment of resistor 34, operates to correspondingly change the oscillator frequency.

Figure 3:
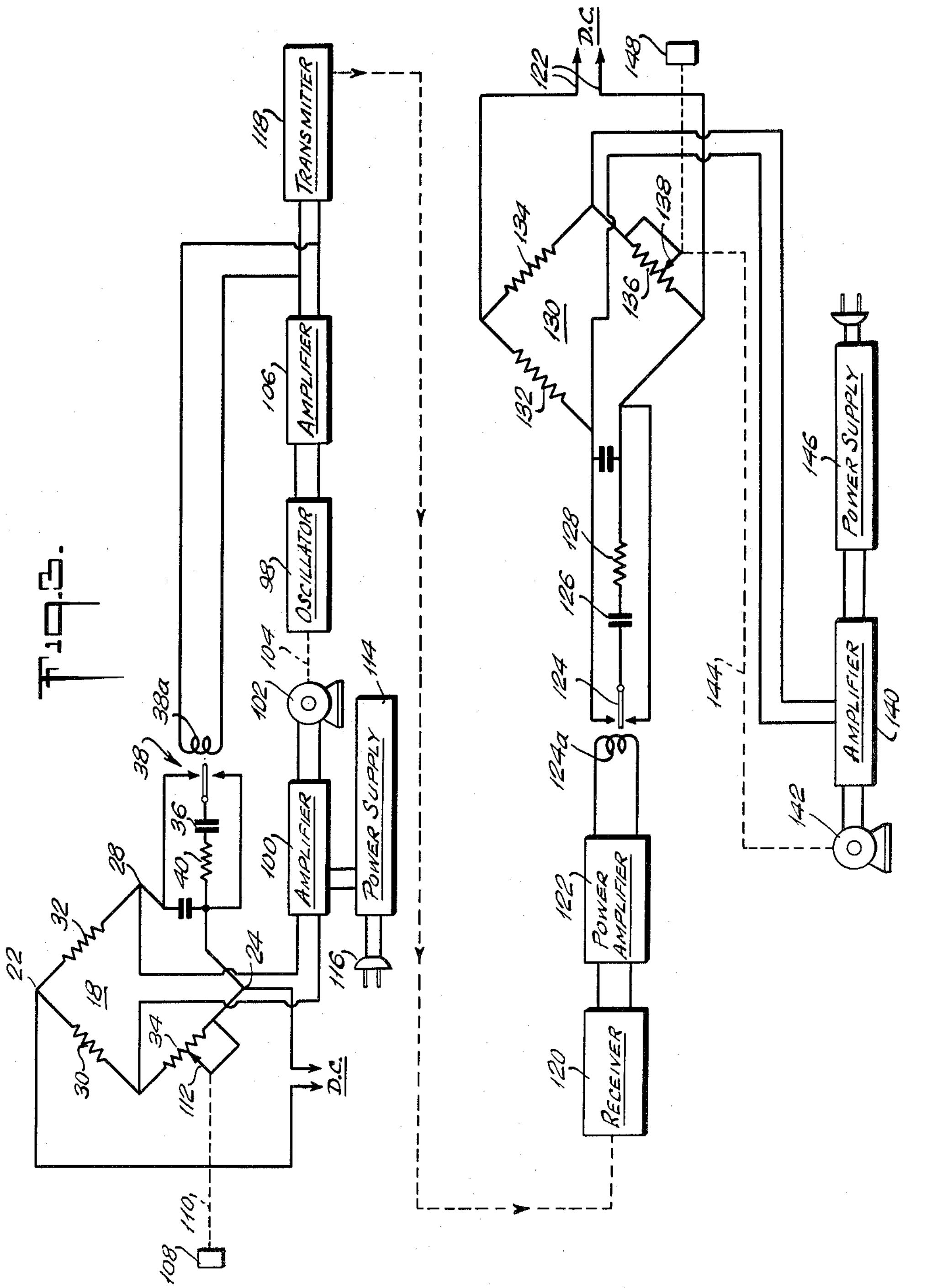
Fig. 3 is a diagram of a remote position control system embodying the invention.

A remote position control or telemetering system embodying the invention is diagrammatically illustrated in Fig. 3. At the sending station the output of a network 18 having a virtual resistance across terminals 34 and 28 determined by the frequency of charge and discharge of condenser 36 controls the frequency of an oscillator 98 through the intermediary of an amplifier 100 and servomotor 102, the control of the oscillator frequency by the motor being indicated diagrammatically by the dashed line 104. Oscillator 98 through a suitable amplifier 106 energizes coil 38*a* of the switch 38 to operate the switch at the frequency of the oscillator. A knob 108, preferably precision graduated, is mechanically coupled, as indicated by the dashed line 110 to the movable contact 112 of resistor 34 for manual adjustment of the position of the contact. A suitable power supply for amplifier 100 is indicated at 114 and a male plug for coupling the power supply with line wires (not shown) is indicated at 116. The bridge 18 is energized from any suitable source of direct current connected across terminals 22 and 24.

With the arrangement thus far described, when an operator changes the position of the contact 112, assuming the bridge previously in balance, the amplified output unbalance voltage of the bridge network is impressed upon motor 102 which thereupon changes the frequency of oscillator 98 in a direction to restore balance of the bridge. The circuit thus operates to control the frequency of oscillator 98 in accordance with the position of contact 112. In order that the position of an element at a remote location may be made to correspond with the position of contact 112, the frequency of oscillator 98 is transmitted from one location, that of the system so far described, by any suitable transmitter, indicated diagrammatically at 118. The transmitter 118 may include means for modulating a carrier frequency with the frequency of the oscillator, or it may include means for converting the electrical energy impressed upon it into sound waves when the frequency is of the proper magnitude and transmission is not to take place over too long a distance. In any event, the energy transmitted by transmitter 118 is picked up by a receiver 120 at the location of the element to be controlled and after amplification in a power amplifier 122 and demodulation if necessary, is impressed across a coil 124*a* controlling the rate of vibration of switch element 124 of a virtual resistor unit which, like the corresponding unit at the sending station, includes a condenser 126 and resistor 128 connected to form one arm of a Wheatstone bridge network 130. This network duplicates the network at the input station as it includes fixed resistors 132 and 134 and a resistor 136 having a variable contact 138 electrically connected to one end of the resistor for shunting a variable part thereof. The position of the contact 138 is controlled in response to unbalance of the bridge network in order to bring it into the position of the control contact 112 of the sending station. For this purpose the output circuit of the bridge 130 is connected through a suitable amplifier 140 to a servomotor 142 the shaft of which is mechanically coupled, as indicated by the dashed line 144, to contact 138. Amplifier 140 is energized from a suitable source of power indicated by the power supply 146 and the bridge 130 is energized with direct current from any suitable source applied to the input terminals. Thus when the frequency of oscillator 98 is changed to restore balance to the network 18 upon repositioning of the contact 112, the bridge 130 at the receiving station is unbalanced because of the corresponding change in virtual resistance of the unit at that station. Unbalance of the bridge 130 causes operation of motor 142 in a direction to move contact 138 until balance of the bridge 130 is restored, at which time there will be an exact correlation between the positions of contacts 112 and 138. A dial, indicated symbolically at 148, may be coupled to the contact 138 and calibrated like knob 108 of the input station for indicating the position of the contact and therefore of knob 108 as well. Additional devices to be positioned in accordance with the input signal could of course be coupled to the shaft of motor 142 for movement in fixed relation to that of contact 138.

The circuit of Fig. 3 is extremely stable. It depends only on fixed resistors and capacitors, which can be obtained with great precision and are not subject to variation. Being dependent upon varying frequency, the system is not influenced by changes in the level of signal strength in the communications medium. Hence ordinary telephone lines, radio communications channels or any channel capable of transmitting a number of recurrent pulses or an electrical sinusoidal wave can be used. Insofar as harmonics fall outside the frequency band to be used, distortion in the communications channel is of no consequence and this is true also of the linearity of the electronic parts of the circuit. The frequency output of the oscillator need not be stable for given shaft rotations. It need not be linear nor need it bear any mathematically explainable relationship to shaft rotations as it may be completely arbitrary so long as it is single valued. The gain of the amplifiers may vary over a wide range as the gain is limited only by the transient stability required of the circuit and does not affect the accuracy. Moreover, the circuit allows frequency multiplexing if it is desired to use single channels of communication to carry many command signals. The system is independent of a common power supply and can be built of simple rugged parts which, if desired, can be readily made portable.

The invention has now been described with reference to several embodiments thereof. Obviously, various changes could be made in the specific circuits and instrumentalities illustrated and described without departing from the spirit of the invention. For example, in each of the illustrated embodiments the virtual resistance includes an electromechanical vibrator or chopper for alternately charging and discharging the condenser. Obviously, electronic switching could be provided if desired and, in the case of high frequencies, such type of switching would be preferable. Similarly, balancing networks other than Wheatstone bridges could be employed, for detecting changes in virtual resistance and oscillator circuits other than those specifically illustrated in Figs. 1 and 2 could be controlled in accordance with the invention and employed in the remote position control system of the invention.

The following is claimed:

1. A remote position control system comprising at each of two locations a bridge network energized by direct current and having resistors in two arms thereof, a controllable resistor in a third arm thereof and a virtual resistor in the fourth arm thereof, said virtual resistor comprising a condenser and a vibratory two-position switch adapted in one position to connect said condenser as the fourth arm of the bridge network and in the other position to disconnect and discharge said condenser, a source of electrical oscillations at one of said locations, means coupled to said source for vibrating both said switches at the frequency of the oscillations produced by said source, means responsive to unbalance of the network at said one location for varying the frequency of oscillations produced by said source in a direction to balance said last mentioned network, and means responsive to unbalance of the network at the other of said locations for adjusting the adjustable resistor of that network in a direction to balance that network whereby the adjustable resistor at said last location is made to follow adjustments made to the adjustable resistor of the network at the first location.

2. A remote position control system comprising at one location a source of electrical oscillations, a frequency determining element associated therewith, a bridge network energized by direct current and having resistors in three arms thereof and means in the fourth arm thereof coupled to said source and yielding a virtual resistance dependent upon the frequency of oscillation of said source, one of said resistors being adjustable, means responsive to unbalance of the bridge network and operative upon said frequency determining element to vary the frequency of oscillations produced by said source in a direction to balance the network, frequency transmitting means coupled to said source and, at another location, frequency receiving means responsive to the frequency transmitted from the first location, a bridge network energized by direct current and having resistors in three arms thereof and means in the fourth arm thereof coupled to said receiving means and yielding a virtual resistance dependent upon the received frequency, one of said resistors of said last mentioned network being adjustable, and means responsive to unbalance of said last mentioned network for adjusting the adjustable resistor thereof in a direction to balance the network whereby a signal applied to the adjustable resistor of the network at the first location is reflected in a corresponding adjustment of the adjustable resistor of the network at the other location.

References Cited in the file of this patent

UNITED STATES PATENTS

| | | |
|---|---|---|
| 2,105,096 | Peterson | Jan. 11, 1938 |
| 2,408,819 | Sorensen | Oct. 8, 1946 |
| 2,503,085 | Williams | Apr. 4, 1950 |
| 2,555,491 | Hoover | June 5, 1951 |